US008973655B2

(12) United States Patent
Stehle et al.

(10) Patent No.: US 8,973,655 B2
(45) Date of Patent: *Mar. 10, 2015

(54) MULTISTAGE PROCESS FOR PRODUCING MINERAL OIL USING MICROORGANISMS

(75) Inventors: Vladimir Stehle, Kassel (DE); Rajan Hollmann, Bad Essen (DE); Robert Thummer, Mannheim (DE)

(73) Assignee: Wintershall Holding GmbH, Kassel (DE)

( * ) Notice: Subject to any disclaimer, the term of this patent is extended or adjusted under 35 U.S.C. 154(b) by 311 days.

This patent is subject to a terminal disclaimer.

(21) Appl. No.: 13/367,520

(22) Filed: Feb. 7, 2012

(65) Prior Publication Data

US 2012/0255729 A1    Oct. 11, 2012

Related U.S. Application Data

(60) Provisional application No. 61/440,435, filed on Feb. 8, 2011.

(51) Int. Cl.
*E21B 43/22*    (2006.01)
*C09K 8/582*    (2006.01)

(52) U.S. Cl.
CPC .................................... *C09K 8/582* (2013.01)
USPC ........................... 166/246; 166/371; 166/400

(58) Field of Classification Search
None
See application file for complete search history.

(56) References Cited

U.S. PATENT DOCUMENTS

| 4,475,590 | A | | 10/1984 | Brown |
| 4,561,500 | A | * | 12/1985 | Thompson et al. ........... 166/246 |
| 4,844,168 | A | | 7/1989 | Sydansk |
| 4,889,563 | A | | 12/1989 | Parker et al. |
| 4,905,761 | A | | 3/1990 | Bryant |
| 6,758,270 | B1 | | 7/2004 | Sunde et al. |
| 6,838,417 | B2 | | 1/2005 | Bouwmeester et al. |
| 7,273,101 | B2 | | 9/2007 | Davies et al. |
| 2007/0092930 | A1 | * | 4/2007 | Lal et al. ......................... 435/41 |
| 2008/0035344 | A1 | | 2/2008 | Odeh et al. |
| 2011/0088899 | A1 | | 4/2011 | Stehle et al. |

FOREIGN PATENT DOCUMENTS

| DE | 4127744 A1 * | 2/1993 |
| RU | 2 060 371 C1 | 5/1996 |
| RU | 2 066 743 C1 | 9/1996 |
| RU | 2 194 849 C1 | 12/2002 |
| RU | 2 204 014 C1 | 5/2003 |
| RU | 2 339 803 C2 | 11/2008 |

(Continued)

OTHER PUBLICATIONS

Kevin C. Taylor, *Water-soluble hydrophobically associating polymers for improved oil recovery: A literature review*, Journal of Petroleum Science and Engineering 19 91998) pp. 265-280.

(Continued)

*Primary Examiner* — Zakiya W Bates
(74) *Attorney, Agent, or Firm* — Drinker Biddle & Reath LLP

(57) ABSTRACT

A multistage process for producing mineral oil from mineral oil deposits by injecting aqueous flooding media into a mineral oil formation through injection boreholes and withdrawing the mineral oil through production boreholes, in which the mineral oil yield is increased by the use of microorganisms in combination with measures for blocking highly permeable zones of the mineral oil formation.

12 Claims, 4 Drawing Sheets

(56) References Cited

FOREIGN PATENT DOCUMENTS

SU           1 654 554 A1    6/1991
WO    WO-2007/135617 A1    11/2007

OTHER PUBLICATIONS

U.S. Appl. No. 13/367,565, filed Feb. 7, 2012, Stehle et al.
Borling, et al., "Pushing Out the Oil with Conformance Control", Oilfield Review, (1994), pp. 44-58.
Nazina, et al., "The Phylogenetic Diversity of Aerobic Organotrophic Bacteria from the Dagang High-Termperature Oil Field", Microbiology, vol. 74, No. 3, (2005), pp. 343-351 (translated).
Nazina, et al., "Microbiological and Production Characteristics of the High-Temperature Kongdian Petroleum Reservoir Revealed During Field Trial of Biotechnology for the Enhancement of Oil Recovery", Microbiology, vol. 76, No. 3 (2007), pp. 297-309.
Belyaev, et al., "Use of Microorganisms in the Biotechnology for the Enhancement of Oil Recovery", Microbiology, vol. 73, No. 5, (2004), pp. 590-598. (translated).
Nazina, et al., "Production of Oil-Releasing Compounds by Microorganisms from the Daqing Oil Field, China", Microbiology, vol. 72, No. 2, (2003), pp. 173-178. (translated).
Altunina, et al., "Improved Oil Recovery of High-Viscosity Oil Pools with Physicochemical Methods and Thermal-Steam Treatments", Oil & Gas Science and Technology, vol. 63, No. 1, (2008), pp. 37-48.
Wikipedia, "Microbial Enhanced Oil Recovery", 13 pages, dated Jul. 9, 2010.

* cited by examiner

MULTISTAGE PROCESS FOR PRODUCING MINERAL OIL USING MICROORGANISMS

CROSS-REFERENCE TO RELATED APPLICATION

This application claims the benefit of U.S. Provisional Application Ser. No. 61/440,435 filed Feb. 8, 2011, the entire contents of which are incorporated herein by reference in its entirety.

FIELD OF THE INVENTION

The present invention relates to a multistage process for producing mineral oil from mineral oil deposits by injecting aqueous flooding media into a mineral oil formation through injection boreholes and withdrawing the mineral oil through production boreholes, in which the mineral oil yield is increased by the use of microorganisms in combination with measures for blocking highly permeable zones of the mineral oil formation.

BACKGROUND

In natural mineral oil deposits, mineral oil occurs in cavities of porous reservoir rocks which are closed off from the surface of the earth by impervious covering layers. In addition to mineral oil, including proportions of natural gas, a deposit further comprises water with a higher or lower salt content. The cavities may be very fine cavities, capillaries, pores or the like, for example those having a diameter of only approx. 1 μm; the formation may additionally also have regions with pores of greater diameter and/or natural fractures.

After the borehole has been sunk into the oil-bearing strata, the oil at first flows to the production boreholes owing to the natural deposit pressure, and erupts from the surface of the earth. This phase of mineral oil production is referred to by the person skilled in the art as primary production. In the case of poor deposit conditions, for example a high oil viscosity, rapidly declining deposit pressure or high flow resistances in the oil-bearing strata, eruptive production rapidly ceases. With primary production, it is possible on average to extract only 2 to 10% of the oil originally present in the deposit. In the case of higher-viscosity mineral oils, eruptive production is generally completely impossible.

In order to enhance the yield, what are known as secondary production processes are therefore used.

The most commonly used process in secondary mineral oil production is water flooding. This involves injecting water through injection boreholes into the oil-bearing strata. This artificially increases the deposit pressure and forces the oil out of the injection boreholes to the production boreholes. By means of water flooding, it is possible to substantially increase the yield level under particular conditions.

In the ideal case of water flooding, a water front proceeding from the injection borehole should force the oil homogeneously over the entire mineral oil formation to the production borehole. In practice, a mineral oil formation, however, has regions with different levels of flow resistance. In addition to oil-saturated reservoir rocks which have fine porosity and a high flow resistance for water, there also exist regions with low flow resistance for water, for example natural or synthetic fractures or very permeable regions in the reservoir rock. Such permeable regions may also be regions from which oil has already been recovered. In the course of water flooding, the flooding water injected naturally flows principally through flow paths with low flow resistance from the injection borehole to the production borehole. The consequences of this are that the oil-saturated deposit regions with fine porosity and high flow resistance are not flooded, and that increasingly more water and less mineral oil is produced via the production borehole. In this context, the person skilled in the art refers to "watering out of production". The effects mentioned are particularly marked in the case of heavy or viscous mineral oils. The higher the mineral oil viscosity, the more probable is rapid watering out of production.

The prior art therefore discloses measures for closing such highly permeable zones between injection boreholes and production boreholes by means of suitable measures. As a result of these, highly permeable zones with low flow resistance are blocked and the flooding water is forced to flow again through the oil-saturated, low-permeability strata. Such measures are also known as "conformance control" measures. An overview of measures for conformance control is given by Boiling et al "*Pushing out the oil with Conformance Control*" in *Oilfield Review* (1994), pages 44 ff.

For conformance control, it is possible to use comparatively low-viscosity formulations of particular chemical substances which can be injected easily into the formation, and the viscosity of which rises significantly only after injection into the formation under the conditions which exist in the formation. To enhance the viscosity, such formulations comprise suitable inorganic or organic, or polymeric, components. The rise in viscosity of the injected formulation can firstly occur with a simple time delay. However, there are also known formulations in which the rise in viscosity is triggered essentially by the temperature rise when the injected formulation is gradually heated to the deposit temperature in the deposit. Formulations whose viscosity rises only under formation conditions are known, for example, as "thermogels" or "delayed gelling systems".

SU 1 654 554 A1 discloses mixtures of aluminum chloride or aluminum nitrate, urea and water, which are injected into the mineral oil formation. At the elevated temperatures in the formation, the urea is hydrolyzed to carbon dioxide and ammonia. The release of the ammonia base significantly increases the pH of the water, and results in precipitation of a highly viscous aluminum hydroxide gel, which blocks the highly permeable zones.

U.S. Pat. No. 4,889,563 discloses the use of aqueous solutions of aluminum hydroxide chloride in combination with urea or hexamethylenetetramine (urotropin) for blocking of underground mineral oil formations. Here too, the hydrolysis of urea or hexamethylenetetramine in the formation leads to an increase in the pH and the precipitation of aluminum hydroxide.

U.S. Pat. No. 4,844,168 discloses a process for blocking sections of high-temperature mineral oil formations, in which polyacrylamide and a polyvalent metal ion, for example Fe(III), Al(III), Cr(III) or Zr (IV), are injected into a mineral oil formation with a reservoir temperature of at least 60° C. Under the conditions in the formation, some of the amide groups —$CONH_2$ are hydrolyzed to —COOH groups, and the metal ions crosslink the —COOH groups formed, such that a gel is formed with a certain time delay.

Further suitable mixtures for "Conformance Control" are disclosed, for example, by RU 2 066 743 C1, WO 2007/135617, U.S. Pat. Nos. 7,273,101 B2, 6,838,417 B2 or US 2008/0035344 A1.

It is additionally known that the mineral oil yield can be enhanced by the use of suitable chemicals as assistants for oil production. With the aid of these measures, the mobility of the mineral oil in the formation should be increased, such that it can be forced out of the formation more easily in the course of water flooding. This phase of mineral oil production is frequently referred to as "Tertiary Oil Production" or "Enhanced Oil Recovery" (EOR). For example, the interfacial tension ρ between the mineral oil and the aqueous phase can be lowered for this purpose by the addition of suitable surfactants, thus increasing the mobility of the oil phase.

This technique is also known as "surfactant flooding". An overview of techniques for tertiary oil production can be found, for example, in the *Journal of Petroleum Science and Engineering* 19 (1998) 265-280.

One known technique for tertiary mineral oil production is to enhance the mineral oil yield by using microorganisms, especially bacteria. This technique is known as "Microbial Enhanced Oil Recovery" (MEOR). This involves either injecting suitable microorganisms, nutrients for the microorganisms and optionally oxygen into the mineral oil formation, or promoting the growth of microorganisms already present in the mineral oil formation by injecting nutrients and optionally oxygen.

There are various known mechanisms by which bacteria can increase the mobility of mineral oil, for example by the formation of surfactants, the formation of polymeric substances and the resulting increase in viscosity of the aqueous phase, the formation of biofilms and the associated cross-sectional constriction of pores up to and including complete blockage (change in the flow paths), reduction in the viscosity of the mineral oil resulting from degradation of high molecular weight hydrocarbons, formation of gases (e.g. $CO_2$ or $CH_4$), formation of organic acids which can attack the rock formation and hence create new flow paths, or resulting from the detachment of the mineral oil from the rock surface. Methods for MEOR and microorganisms suitable for this purpose are disclosed, for example, in U.S. Pat. Nos. 4,475,590, 4,905,761 or 6,758,270 B1.

RU 2 060 371 C1 discloses a process for producing mineral oil using microorganisms from a deposit with inhomogeneous permeability, which has at least one injection borehole and at least one production borehole. In the process described, the deposit pressure is periodically increased and lowered. In pressure increase phases, microorganisms present in the mineral oil formation are activated by injecting a nutrient solution into the mineral oil formation.

Subsequently, the injection borehole is closed. The withdrawal of mineral oil or water mixtures through the production borehole reduces the pressure again.

RU 2 194 849 C1 discloses a process for extracting mineral oil using microorganisms from a deposit with inhomogeneous permeability, which has at least one injection borehole and at least one production borehole. In the process described, the deposit pressure is periodically increased and reduced. In pressure increase phases, microorganisms and nutrient solution are injected into the formation in each case through the injection and production boreholes; in pressure reduction phases, the injection borehole is closed and liquid is withdrawn from the formation through the production borehole. Preference is given to injecting mesophilic bacteria into the injection borehole, and thermophilic bacteria into the production borehole. A disadvantage of this process is the low efficiency since the production borehole does not constantly produce oil but is regularly shut down.

RU 2 204 014 C1 discloses a process for producing mineral oil, in which a nutrient solution and carbon-oxidizing bacteria are injected into a mineral oil formation, followed by a biotechnologically produced polyacrylamide together with a crosslinker.

Mineral oil formations frequently do not have a homogeneous temperature distribution, but rather have more or less significant temperature gradients. Such temperature gradients may be of natural origin, but they can especially be caused by measures for secondary and/or tertiary mineral oil production. In the case of water flooding, cold water is frequently injected into the formation for months or even years. This generally lowers the formation temperature to a greater or lesser degree in the region around the injection borehole. As a typical example, table 1 shows the temperature decline in the formation temperature for some deposits in northern Siberia after prolonged water flooding::

TABLE 1

Deposit temperatures of different Siberian deposits S1 to S6 after prolonged water flooding.

| Deposit | Formation temperature [° C.] | Formation temperature in the injection region [° C.] | Difference [° C.] |
| --- | --- | --- | --- |
| S1 | 90 | 45 | 45 |
| S2 | 72 | 39 | 33 |
| S3 | 78 | 37 | 41 |
| S4 | 78 | 32 | 46 |
| S5 | 101 | 56 | 45 |
| S6 | 85 | 42 | 43 |

BRIEF SUMMARY

It was an object of the invention to provide a process for MEOR, which is particularly suitable for production of mineral oil even from deposits with a heterogeneous temperature distribution.

Accordingly, a process has been found for producing mineral oil from underground mineral oil deposits with deposit temperatures ($T_L$) in the range from 25° C. to 120° C., at least one injection borehole and at least one production borehole being sunk into the formation, and mineral oil being produced from the deposit, by injecting aqueous flooding media into the at least one injection borehole and producing mineral oil through the at least one production borehole, flooding water of temperature<25° C. being injected in a process step (0) such that—as a result of the continued injection of the flooding water—the temperature of the deposit at the site of the injection borehole ($T_I$) is lowered compared to the original deposit temperature $T_L$ and a temperature gradient is built up between the injection borehole and the production borehole with the temperature $T_P \leq T_L$, and wherein the process additionally comprises—in the sequence mentioned—at least the following steps in which the aqueous flooding media mentioned below are each injected into the formation through said at least one injection borehole:

(I) mobilizing mineral oil in the formation by means of microorganisms by
  (Ia) injecting at least one aqueous formulation of oil-mobilizing microorganisms, an aqueous nutrient solution and optionally an oxygen source, and/or
  (Ib) activating oil-mobilizing microorganisms already present in the formation by injecting an aqueous nutrient solution and optionally an oxygen source,
(II) injecting flooding water,
(III) blocking highly permeable regions of the formation,
(IV) injecting flooding water,
(V) mobilizing mineral oil in the formation by means of microorganisms by repetition of process step (I), and
(VI) injecting flooding water.

In a preferred embodiment of the invention, process step (III) is performed by injecting at least one aqueous, gel-forming formulation (F), said formulations (F) comprising water and one or more water-soluble or water-dispersible components which form high-viscosity gels after injection into the deposit under the influence of the deposit temperature and hence completely or partially close the highly permeable regions.

BRIEF DESCRIPTION OF THE DRAWINGS

FIG. 5 Schematic diagram of the formation after the injection of microorganisms into the new flood zone.

DETAILED DESCRIPTION OF THE PREFERRED EMBODIMENTS

Figure 1:
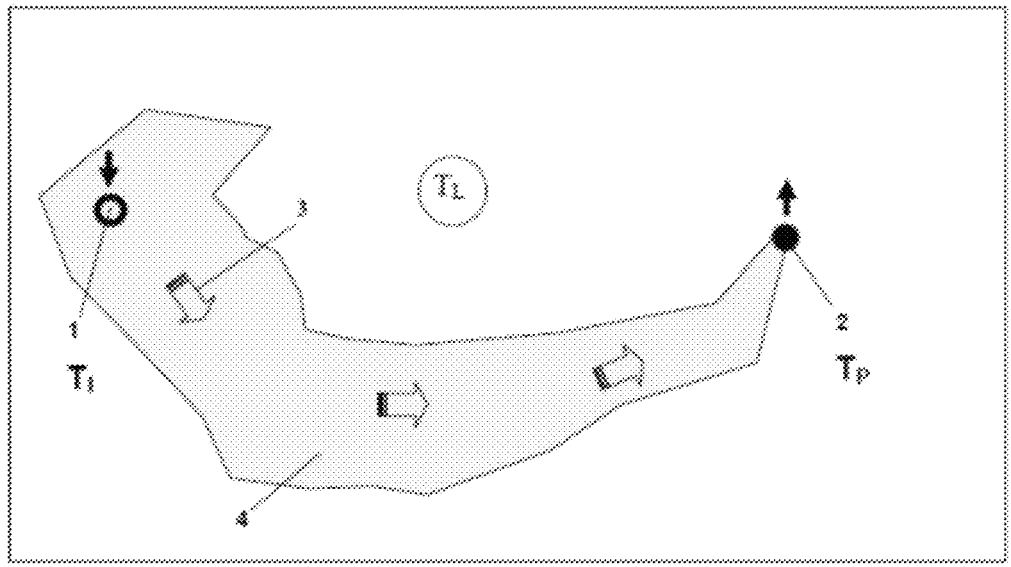
FIG. 1 Schematic diagram of water flooding.

With regard to the invention, the following can be stated specifically:

The process according to the invention is employed once primary mineral oil production has stopped due to the autogenous pressure of the deposit, and the pressure in the deposit is maintained by injection of liquid flooding media. It can be employed advantageously especially when even the injection of water leads only to unsatisfactory results.

Deposits

The mineral oil deposits may be deposits for all kinds of oil, for example those for light or for heavy oil, with the proviso that the deposit temperatures ($T_L$) are in the range from 25° C. to 120° C., preferably 30° C. to 110° C., more preferably 35° C. to 105° C. and, for example, 40° C. to 105° C. The deposit temperature means the naturally existing temperature in the deposit. It can be altered by the process steps described hereinafter.

The deposits have a heterogeneous permeability. This is understood to mean that the permeability is not the same in all regions of the deposit, but that the deposit has zones of higher and lower permeability.

Process

To execute the process, at least one production borehole and at least one injection borehole are sunk into the mineral oil deposit. In general, a deposit is provided with several injection boreholes and optionally with several production boreholes. Aqueous flooding media can be injected into the mineral oil deposit through the injection boreholes, and mineral oil is withdrawn from the deposit through the production boreholes. The aqueous flooding media used in each of the individual process steps are described hereinafter. According to the invention, the aqueous flooding media are injected in the process steps described hereinafter always using the same injection boreholes; thus, no new injection boreholes are drilled. What is important hereinafter is not whether the terms "injection borehole" or "production borehole" are used hereinafter in the singular or plural, but what is meant in each case is "at least one injection borehole" or "at least one production borehole".

The term "mineral oil" here of course does not mean single-phase mineral oil, but what is meant is the customary emulsions which comprise oil and formation water and are produced from mineral oil deposits. The oil phase and the water phase are separated after production in a manner known in principle.

Process Step (0)

The process according to the invention is employed in a deposit in which the pressure is already being maintained by injecting flooding water. This involves injecting flooding water into the injection borehole(s) and withdrawing mineral oil from the production boreholes. This procedure is also known as "water flooding". The flooding water used may be all kinds of water, for example fresh water, salt water or brine, and the water may optionally also comprise further additives. The water flooding may already have lasted for months or even years. This process step preceding process step (I) is referred to hereinafter as process step (0).

Process step (0) alters the original conditions in the deposit.

As pressure is built up by the flooding water injected into the injection borehole, the mineral oil in the formation is forced in the direction of the production borehole, naturally on the path of least resistance. The mineral oil or the flooding water thus flows initially through zones of relatively high permeability.

Accordingly, in a zone thus formed in the region between the injection borehole and the production borehole, in which oil is displaced by water, while no mineral oil is displaced from other regions of the formation. This is shown schematically in FIG. 1. Water is injected into the injection borehole (1), flows from there in the direction of the production borehole (2), and in the process forces mineral oil out of the pores in the direction of the production borehole. The flow direction is indicated by the arrow (3). Within the (gray-shaded) zone (4), mineral oil is at least partly displaced by the water front.

The direction of the water front (3) and the size and position of the zone (4) are determined by the circumstances in the deposit, for example the three-dimensional dynamics of the permeability characteristic, fissuring or local geological faults. The zone (4) may have a complicated branched form, especially when several injection boreholes for water and several production boreholes are present in this section.

In the flow zone (4), the flooding water generally does not force the mineral oil onward in a homogeneous manner. The reason for this is that the permeability is generally not homogeneous in the flow zone either. When more porous regions are present, for example fine cracks, fractures or fissures, the water flows preferentially through these zones of relatively low flow resistance. Moreover, the oil under some circumstances is removed only partially from pores. For example, an oil droplet which is not entrained by the water flowing through these pores can remain in a pore. With increasing duration of water flooding, preferential flow paths for the water form can form to an ever greater degree. As a result of this, ever more water reaches the production borehole and, correspondingly, the proportion of water in the oil-water mixture produced increases with increasing duration of water flooding. This effect is known to the person skilled in the art as "watering out of production". Watering out of production is therefore a sign that the aqueous flooding medium is no longer flowing homogeneously through the formation from the injection borehole to the production borehole, but has found preferred flow paths through zones of greater than average permeability in the formation. The flooding water flowing through preferred flow paths no longer mobilizes any oil, or at least mobilizes it only insufficiently. Considerable amounts of oil can still remain in the flow zone (4). Moreover, further mineral oil still remains in the mineral oil formation outside the zone (4), The process according to the invention can be used particularly advantageously when watering out of production has already set in. It can especially be used when watering out of production has reached 70 to 80%.

The injection of flooding water additionally alters the temperature distribution in the mineral oil formation. This is because the flooding water used for injection is generally comparatively cold. It may, for example, be seawater. It therefore generally has a temperature of less than 25° C., preferably less than 20° C. and frequently even distinctly lower.

As a consequence of the advanced injection of cold flooding water, the temperature of the deposit at the site of the injection borehole falls at first compared to the original deposit temperature $T_L$. The temperature of the deposit at the site of the injection borehole shall be referred to hereinafter as $T_I$. The flow of the flooding water in the direction of the production borehole (i.e. of zone (4)) can also cool further regions of the flow zone. Of course, the cooling effect is at its greatest at the injection borehole and decreases with increasing distance from the production borehole.

In the flow zone (4) between the injection borehole (1) and the production borehole (2), a temperature gradient thus forms, with the temperature tending to rise in the direction of the production borehole, but—according to the flow conditions—not necessarily homogeneously.

Accordingly, the temperature of the deposit at the injection borehole $(T_I)$ is lower than the temperature of the deposit at the production borehole $(T_P)$. According to the conditions, $T_P$ may be equal to the deposit temperature $T_L$, or else the production borehole may already have been cooled somewhat by the influx of colder flooding water, in which case $T_P \leq T_L$. The temperature difference $T_P - T_I$ is generally at least 5° C., preferably at least 10° C. and more preferably at least 20° C., and especially at least 30° C., for example 5° C. to 60° C., preferably 10° C. to 55° C., more preferably 15° C. to 50° C.

Process Step (I)

In process step (I), the mineral oil formation is treated with suitable microorganisms. In a first embodiment (Ia), the treatment can be effected by injecting suitable microorganisms into the deposit. In a second embodiment (Ib), microorganisms already present in the mineral oil formation are activated. By means of both methods, further mineral oil in the formation is mobilized and the mineral oil yield is enhanced again. The mobilization is effected essentially in the region between the injection borehole and the production borehole which has already been partially exploited by process step (0) (zone (4) in FIG. 1), but it is additionally also possible in principle to cover further regions of the formation.

For preparation for process step (I), geophysical and biochemical studies of the mineral oil formation should appropriately first be carried out. Firstly, the temperature distribution of the mineral oil formation is determined, at least in the region between injection borehole and production borehole, and especially in the region of the water flow zone ((4) in FIG. 1). Methods of determining the temperature distribution of a mineral oil deposit are known in principle to those skilled in the art. It will generally be undertaken from temperature measurements at particular sites in the formation in combination with simulation calculations, the simulation calculations taking account of factors including amounts of heat introduced into the formation and the amounts of heat removed from the formation. By means of biochemical analyses, it is possible to detect the presence and amount of aerobic and anaerobic microorganisms in the region of the injection borehole (1) and of the production borehole (2) close to the base of the borehole. For this purpose, samples can be taken from the formation. In addition, the production water or injection water backwash can be analyzed for the presence of microorganisms.

Process Step (Ia)

In the embodiment (Ia), at least one aqueous formulation of oil-mobilizing microorganisms, especially bacteria, is injected into the formation. The microorganisms may be aerobic or anaerobic, preferably anaerobic, microorganisms. In addition, a nutrient solution and optionally an oxygen source are injected into the mineral oil formation. The microorganisms enter through the injection boreholes at a site in the formation with the temperature $(T_I)$. Like the water flooding in the preceding process step (0), the aqueous formulation flows preferably into the already partially exploited zone in the region between the injection borehole and the production borehole (i.e. zone (4) in FIG. 1), but it is not impossible that the microorganism-containing flooding medium additionally also flows via new flow paths.

The three components, microorganisms, nutrient solution and optionally an oxygen source, can be injected together, or else successively in individual portions, such that microorganisms, nutrient solution and optionally the oxygen source do not mix with one another until within the formation. The oxygen source may be an oxygen-forming substance, for example hydrogen peroxide, or preferably an oxygenous gas. An oxygenous gas can be injected as such, or it is possible with preference to inject an oxygenous flooding medium, especially oxygenous water or brine. The concentration of dissolved oxygen in the aqueous flooding medium, especially water, may, for example, be 0.05 to 0.5 $m^3$ of oxygen/$m^3$ of flooding medium. An oxygenous gas is injected in the case of use of aerobic microorganisms, and is omitted in the case of use of anaerobic microorganisms.

Suitable microorganisms for mobilizing mineral oil in a mineral oil formation are known in principle to the person skilled in the art, for example from the literature cited at the outset. Mineral oil can be mobilized on the basis of one or more of the following mechanisms: formation of surfactants, reduction in the viscosity of the mineral oil resulting from degradation of high molecular weight hydrocarbons, formation of $CO_2$ and/or methane, formation of organic acids which can attack the rock formation and hence create new flow paths, or resulting from the detachment of the mineral oil from the rock surface.

Examples of suitable microorganisms are mentioned, for example, in *"The Phylogenetic Diversity of Aerobic Organotrophic Bacteria from the Dagang High-Temperature Oil Field"* T. N. Nazina, D. Sh. Sokolova, N. M Shestakova, A. A. Grigoryan, E. M. Mikhallova, T. L. Babich, A. M Lysenko, T. P. Tourova, A. B. Poltaraus, Qingxian Feng, Fangtian Ni, and S. S. Belyaev *Microbiology*, Vol. 74, No. 3, 2005, pp. 343-351. Translated from *Mikrobiologiya*, Vol. 74, No. 3, 2005, pp. 401-409 or *"Use of Microorganisms in the Biotechnology for the Enhancement of Oil Recovery.* S. S. Belyaev, I. A. Borzenkov, T. N. Nazina, E. P. Rozanova, I. F. Glumov, R. R. Ibatullin, and M. V. Ivanov, *Microbiology*, Vol. 73, No. 5, 2004, pp. 590-598".

Examples of suitable microorganisms comprise anaerobic representatives of various genera, for example *Clostridium* sp., *Bacillus* sp., *Desulfovibrio* sp., *Arthrobacter* sp., *Mycobacterium* sp., *Micrococcus* sp., *Brevibacillus* sp., *Actinomyces* sp. or *Pseudomonas* sp.

Suitable nutrient solutions for microorganisms are known in principle to the person skilled in the art. They comprise, for example, phosphate or ammonium salts. They may comprise, as main components, for example, $NaNO_3$, $KNO_3$, $NH_4NO_3$, $Na_2HPO_4$, $NH_4Cl$, trace elements, for example B, Zn, Cu, Co, Mg, Mn, Fe, Mo, W, Ni, Se, vitamins such as folic acid, ascorbic acid, riboflavin, electron acceptors such as $SO_4^{2-}$, $NO_3^-$, $Fe^{3+}$, humic acids, mineral oxides, quinone compounds or combinations thereof.

The maximum growth rate of microorganisms depends on the temperature. The temperature at which the growth of the microorganisms is at its greatest shall be referred to hereinafter as $T_W$. In this context, the person skilled in the art distinguishes between different classes of microorganisms, namely psychrophilic, mesophilic, thermophilic and hyperthermophilic bacteria, and the temperature ranges of maximum growth rate may be defined slightly differently according to the literature reference. Table 3 below shows a typical classification on which the present invention shall be based.

TABLE 2

Minimum, maximum and optimal growth temperature for different classes of microorganisms.

|  | Minimum temperature | Optimum | Maximum temperature |
|---|---|---|---|
| Psychrophiles | −5° C. | 12 to 15° C. | 25° C. |
| Mesophiles | 15° C. | 30 to 40° C. | 47° C. |
| Thermophiles | 40° C. | 55 to 75° C. | 90° C. |
| Hyperthermophiles | 70° C. | 80 to 90° C. | 110° C. |

In order to achieve an optimal result, the type of microorganisms used should be matched to the temperature in the already partially exploited zone in the region between the injection borehole and the production borehole. According to the temperature of the zone mentioned, psychrophilic, mesophilic, thermophilic or hyperthermophilic microorganisms are selected and, within each class, also as far as possible those microorganisms which have a maximum growth rate at the temperature of the deposit in the partially exploited zone. In general, $T_W$ should be in the range from $T_I$ to $T_P$.

In table 3 below, some microorganisms are compiled, with the optimal growth temperature for each:

TABLE 3

Optimal growth temperature of different microorganisms

| Psychrophiles | Mesophiles | Thermophiles | Hyperthermophiles |
|---|---|---|---|
| Flavobacterium antarcticum 15° C. | Escherichia coli 37° C. | Streptococcus thermophilus 45° C. | Aquifex pyrophilus 85° C. |
| Photobacterium profundum 10° C. | Streptomyces coelicolor 28° C. | Geobacillus stearothermophilus 55° C. | Pyrodictium brockii 85-105° C. |
| Shewanella benthica 4° C. | Bacillus subtilis 30° C. | Thermus aquaticus 70° C. | Pyrobaculum islandicum 95-100° C. |
| Chlamydomonas nivalis | Corynebacterium glutamicum 30° C. | Streptomyces thermogriseus 55-60° C. | Methanopyrus kandleri 98° C. |
| Flavobacterium frigidarium 15° C. | Pseudomonas putida 26° C. | Clostridium stercorarium 60° C. | Ignisphaera aggregans 92° C. |
| Leptothrix mobilis 25° C. | Salmonella enterica 30-37° C. | Thermovorax subterraneus 70° C. | Archaeoglobus veneficus 75° C. |
| Bacillus marinus 20° C. | Micrococcus luteus 30° C. | Geothermobacter ehrlichii 50-55° C. | Geoglobus acetivorans 80° C. |

It will be appreciated that it is also possible to use several different microorganisms for process step (Ia), for example microorganisms which evolve gases and microorganisms which evolve surfactants. The microorganisms can be injected together or else successively. It is optionally also possible to inject an aqueous formulation in each case, especially water, between individual formulations comprising microorganisms.

The use of different microorganisms is advisable especially in the case of mineral oil formations with relatively large temperature differences $T_P$-$T_I$, for example formations with a temperature difference $T_P$-$T_I$ of at least 20° C., especially of at least 30° C., for example those with a difference of 30 to 50° C. In a preferred embodiment of the invention, therefore, n formulations with different optimal growth temperatures $T_{Wn}$ are injected, where n≥2, and where the optimal growth temperature of each portion of the microorganisms injected decreases. It is optionally possible to inject flooding water in each case between individual formulations comprising microorganisms.

Figure 2:
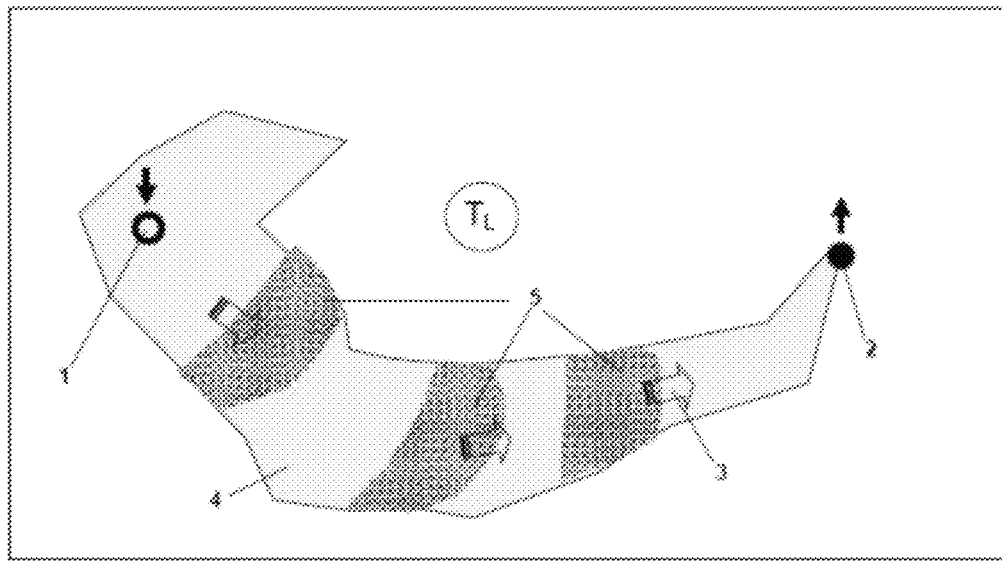
FIG. 2 Schematic diagram of the formation after the injection of microorganisms.

By means of the outlined preferred embodiment of the invention, microorganisms can mobilize additional mineral oil in the entire partially exploited region between the at least one injection borehole and the at least one production borehole, and not only in part of the region thereof. FIG. 2 shows a schematic of the formation already shown, after the injection of 3 different portions of microorganisms (5).

Process Step (Ib)

In embodiment (Ib), no microorganisms are injected into the formation, but rather oil-mobilizing microorganisms already present in the formation, especially bacteria, are activated.

The microorganisms present are activated by injection of an aqueous nutrient solution and optionally of an oxygen source, especially of an oxygenous gas, and the gas may also be present in the nutrient solution. Details of the nutrient solutions and the means of injecting oxygen into the formation have already been outlined at the outset.

In one embodiment of process step (Ib), it is possible to alternately activate aerobic and anaerobic microorganisms. In this case, oxygen-containing nutrient solution and nutrient solutions comprising only little oxygen, if any, are injected alternately.

The two process steps (Ia) and (Ib) can of course be combined with one another. For example, in a first step, it is first possible to activate microorganisms present in the formation and, in a second step, to inject additional microorganisms, nutrient solution and optionally oxygen into the formation.

In process step (I), the production borehole(s) should not be sealed, but rather the abovementioned flooding media are injected continuously into the formation and, accordingly, mineral oil can also be withdrawn consistently through the production borehole(s). This does not rule out brief closure. In general, the production boreholes, however, should be open over at least 80% of the total time for process step (I).

By means of process step (I), mineral oil which has been immobilized to date in the formation is mobilized and, accordingly, the production of mineral oil can be enhanced again, and the watering out of production decreases.

Process Step (II)

After the mobilization of mineral oil in the formation by means of process step (I), the production of mineral oil is continued by injection of flooding water into the injection borehole and withdrawal of mineral oil through the production borehole.

The oil mobilized by the microorganisms is thus produced by further water flooding. As a result of the continuing removal of oil from the already partially exploited zone, the permeability of the water flow zone increases further, and new, preferred flow paths ultimately form again. This again causes distinct watering out of production.

Process Step (III)

In process step (III), highly permeable regions of the formation are blocked. The highly permeable regions are essentially the water flow zone which has already been outlined, in the region between the at least one injection borehole and the at least one production borehole, i.e. essentially that zone in which, in process step (I), the mobility of oil has been improved by injection or activation of microorganisms. However, it is also possible to block further highly permeable regions, for example those which have only formed as a result of process step (II).

Techniques for blocking highly permeable regions of mineral oil formations are known in principle to those skilled in the art, for example from the literature cited at the outset. These involve injecting suitable aqueous formulations into the formation through the injection borehole, which can bring about closure of the highly permeable regions.

Figure 3:
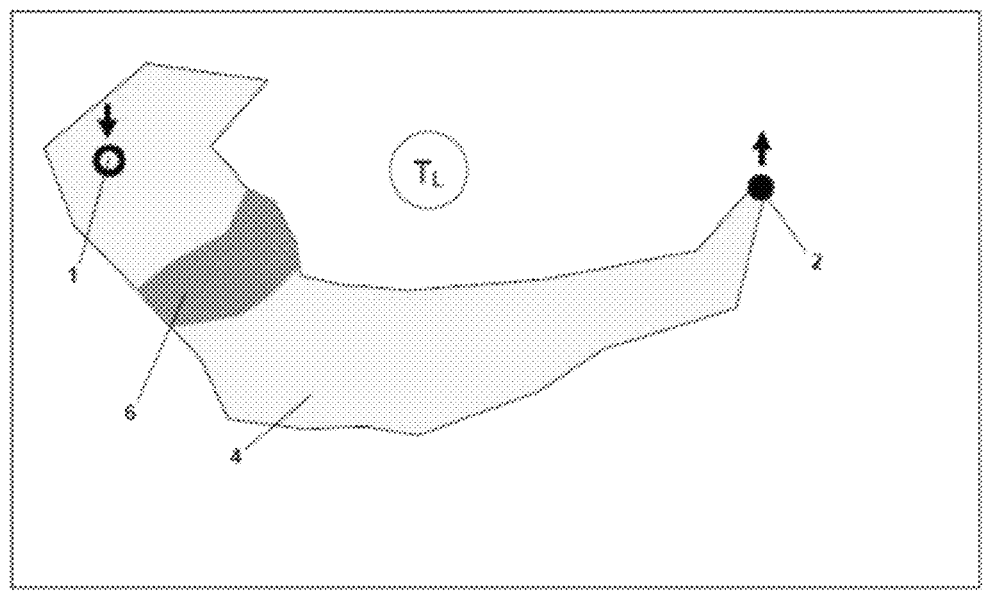
FIG. 3 Schematic diagram of the closure of highly permeable regions of the formation by gels.

In a preferred embodiment of the invention, process step (III) is performed by injecting at least one aqueous, gel-forming formulation (F), said formulations (F) comprising water and one or more water-soluble or water-dispersible components which form high-viscosity gels after injection into the deposit under the influence of the deposit temperature. After being injected into the formation, the formulations (F) naturally flow esssentially through the highly permeable regions and close them after the gel has formed. This is shown schematically in FIG. 3. A gel plug (6) closes the highly permeable regions between the injection borehole and the production borehole.

Aqueous, gel-forming formulations for blockage of permeable regions of a mineral oil formation are known in principle to those skilled in the art. The aqueous, gel-forming formulations (F) comprise, as well as water, one or more different water-soluble or water-dispersible chemical components which are responsible for gel formation. These are preferably at least two different components. They may be either inorganic components or organic components, and of course also combinations of inorganic and organic components.

For example, they may be formulations based on water-soluble polymers, as disclosed, for example, by U.S. Pat. Nos. 4,844,168, 6,838,417 B2 or US 2008/0035344 A1, or formulations based essentially on inorganic components, as disclosed, for example, by SU 1 654 554 A1, U.S. Pat. No. 4,889,563, RU 2 066 743 C1, WO 2007/135617, U.S. Pat. No. 7,273,101 B2 or RU 2 339 803 C2. Suitable formulations are also commercially available.

The temperature from which gel formation sets in (referred to hereinafter as $T_{gel}$) and the time after which this occurs (referred to hereinafter as $t_{gel}$) can be influenced, for example, by the type and concentration of the components. They can be adjusted such that gels are formed between 20 and 120° C., preferably 30 and 120° C. and more preferably 40 and 120° C. The citations cited comprise figures for this. The formulations can thus be adjusted such that the formulations form gels at the desired site in the highly permeable regions and block the highly permeable regions.

In a preferred embodiment, the formulation (F) is an acidic aqueous formulation, preferably having a pH≤5, at least comprising water,
a metal compound which is dissolved therein and can form gels when admixed with bases, and
a water-soluble activator which brings about an increase in the pH of the aqueous solution above a temperature $T \geq T_{gel}$.

In addition to water, the formulation may optionally comprise further water-miscible organic solvents. Examples of such solvents comprise alcohols. In general, the formulations (F) should, however, comprise at least 80% by weight of water based on the sum of all solvents in the formulation, preferably at least 90% by weight and more preferably at least 95% by weight. Most preferably, only water should be present.

The dissolved metal compound preferably comprises aluminum compounds, especially dissolved aluminum(III) salts, for example aluminum(III) chloride, aluminum(III) nitrate, aluminum(III) sulfate, aluminum(III) acetate or aluminum (III) acetylacetonate. However, the dissolved metal compound may also be already partially hydrolyzed aluminum (III) salts, for example aluminum hydroxychloride. It will be appreciated that it is also possible to use mixtures of several different aluminum compounds. The pH of the formulation is generally ≤5, preferably ≤4.5. Preference is given to aluminum(III) chloride, aluminum(III) nitrate or aluminum(III) sulfate, very particularly preference to aluminum(III) chloride.

Useful water-soluble activators include all compounds which, when heated to a temperature $T>T_{gel}$ in an aqueous medium, release bases or bind acids and hence ensure an increase in the pH of the solution. The increase in the pH forms high-viscosity, water-insoluble gels which comprise metal ions, hydroxide ions and optionally further components. In the case of use of aluminum compounds, an aluminum hydroxide or oxide hydrate gel may form, into which further components, for example the anions of the aluminum salt used, may of course also comprise. The water-soluble activators used may, for example, be urea, substituted ureas such as N,N'-alkylureas, especially N,N'-dimethylurea, hexamethylenetetramine (urotropin) or cyanates, especially urea, substituted ureas or hexamethylenetetramine. Urea, for example, is hydrolyzed in an aqueous medium to ammonia and $CO_2$. It will be appreciated that it is also possible to use mixtures of several different activators. Preference is given to urea and/or hexamethylenetetramine.

The formulations may additionally comprise further components which can accelerate or slow gel formation. Examples comprise further salts or naphthenic acids.

The concentrations of the metal compounds used are selected by the person skilled in the art such that a gel forms with the desired viscosity. The activator will therefore be used in such a concentration that a sufficient amount of base can form to lower the pH to such an extent that a gel can actually precipitate out. In addition, the amounts and the ratios can also be used to determine the gel formation time $t_{gel}$. The higher the concentration of the activator—at a given concentration of the metal compound—the higher the rate of gel formation. This relationship can be utilized by the person skilled in the art to deliberately accelerate or to slow the gel formation time $T_{gel}$. The rate of gel formation after exceedance of $T_{gel}$ is naturally also determined by the temperature which exists in the formation. In the case of aluminum, an amount of 0.2 to 3% by weight of aluminum(III), based on the aqueous formulation, has been found to be useful. The amount of the activator should at least be such that 3 mol of base are released per mol of Al(III).

Table 4 below shows, by way of example, the time until gel formation for a mixture of 8% by weight of $AlCl_3$ (calculated as anhydrous product, corresponds to 1.6% by weight of Al(III)), 25% by weight of urea and 67% by weight of water.

TABLE 4

Time until gel formation at different temperatures

| Temperature [° C.] | 100 | 90 | 80 | 70 | 60 |
|---|---|---|---|---|---|
| Gel formation time [days] | ¼ | 1 | 3 | 6 | 30 |

Table 5 below shows the time until gel formation for different mixtures of $AlCl_3$ (calculated as anhydrous product), urea and water at 100° C. or 100° C.

TABLE 5

Time until gel formation ("—" no measurement)

| Amounts used | | Weight ratio of $AlCl_3$/urea | Time until gel formation [h] | |
|---|---|---|---|---|
| | [% by wt.] | | 100° C. | 110° C. |
| $AlCl_3$ | 4 | 1:4 | 4.0 | — |
| urea | 16 | | | |
| $AlCl_3$ | 4 | 1:3 | 4.3 | — |
| urea | 12 | | | |
| $AlCl_3$ | 4 | 1:2 | 7.3 | — |
| urea | 8 | | | |
| $AlCl_3$ | 4 | 1:1 | 19.0 | — |
| urea | 4 | | | |
| $AlCl_3$ | 8 | 1:3.75 | 5.3 | 2 |
| urea | 30 | | | |
| $AlCl_3$ | 2 | 1:3.75 | — | 8 |
| urea | 7.5 | | | |
| $AlCl_3$ | 8 | 1:3 | 5.5 | — |
| urea | 24 | | | |
| $AlCl_3$ | 8 | 1:2 | 8.3 | — |
| urea | 16 | | | |
| $AlCl_3$ | 8 | 1:1 | 18.0 | — |
| urea | 8 | | | |
| $AlCl_3$ | 8 | 1:0.75 | 23.0 | — |
| urea | 6 | | | |

It can be seen that, with decreasing amount of the urea activator, the time to formation of the gel becomes ever longer both for the series with 8% by weight of $AlCl_3$ and the series with 4% by weight of $AlCl_3$ with decreasing amount of urea. The gel formation time can thus be altered in a controlled manner via the aluminum salt/urea ratio.

Gel-forming formulations which are particularly suitable for low deposit temperatures can be obtained by replacing all or some of the urea as an activator with urotropin (hexamethylenetetramine) as an activator. Urotropin likewise releases ammonia under deposit conditions. Such gel-forming formulations also lead to gel formation at temperatures below 50° C. Typical aqueous formulations may comprise 4 to 16% by weight of urea, 2 to 8% by weight of urotropin and 2 to 4% by weight of aluminum chloride or nitrate (calculated as anhydrous salt) and water or salt water. Such formulations are disclosed, for example, by RU 2 066 743 C1. Table 6 below compares some formulations disclosed in RU 2 066 743 C1, pages 5 to 7, and the gel formation thereof at different temperatures.

TABLE 6

Gel formantion as a function of temperature and time

| | | | | Temperature | | | | | | |
|---|---|---|---|---|---|---|---|---|---|---|
| | | | | 20° C. | | 50° C. | | 70° C. | | 90° C. | |
| | | | Viscosity η before heat treatment | Gel formation time | | | | | | | |
| No. | Components | % by wt. | [MPa · s] | $t_{Gel}$ [days] | η [MPa · s] | $t_{Gel}$ [days] | η [MPa · s] | $t_{Gel}$ [days] | η [MPa · s] | $t_{Gel}$ [days] | η [MPa · s] |
| 1 | Urea | 16.0 | 2.4 | 100 | No gel formation | 27 | No gel formation | 4 | 3240 | | |
| | $AlCl_3$ | 4.0 | | | | | | | | | |
| 2 | Urea | 16.0 | 2.4 | 3 | 6960 | 1 | 4980 | 0.5 | 2500.0 | 0.5 | 2700 |
| | $AlCl_3$ | 4.0 | | | | | | | | | |
| | Urotropin | 8.0 | | | | | | | | | |
| 4 | Urea | 16.0 | 1.5 | 2 | 1830 | 3 | 4100 | 1 | 2100.0 | 1 | 2800.0 |
| | $AlCl_3$ | 4.0 | | | | | | | | | |
| | Urotropin | 6.0 | | | | | | | | | |
| 8 | Urea | 16 | 2.0 | 7 | 374.0 | 3 | 3870 | 1 | 2100.0 | 0.5 | 1200.0 |
| | $AlCl_3$ | 2.0 | | | | | | | | | |
| | Urotropin | 8.0 | | | | | | | | | |
| 9 | Urea | 16 | 1.5 | 7 | 1300.0 | 2 | 3500 | | | | |
| | $AlCl_3$ | 4.0 | | | | | | | | | |
| | Urotropin | 4.0 | | | | | | | | | |
| 5 | Urea | 8.0 | 1.6 | 2 | 3210 | 2 | 6100 | 1 | 2870.0 | 0.5 | 2900.0 |
| | $AlCl_3$ | 4.0 | | | | | | | | | |
| | Urotropin | 8.0 | | | | | | | | | |
| 7 | Urea | 8.0 | 1.6 | 4 | 600.0 | 4 | 6050 | 1 | 2200.0 | 1 | 2300.0 |
| | $AlCl_3$ | 2.0 | | | | | | | | | |
| | Urotropin | 4.0 | | | | | | | | | |
| 6 | Urea | 6.0 | 1.5 | 2 | 1830 | 2 | 4100 | 1 | 2500.0 | 1 | 5800.0 |
| | $AlCl_3$ | 4.0 | | | | | | | | | |
| | Urotropin | 8.0 | | | | | | | | | |
| 3 | Urea | 4.0 | 1.4 | 7 | 2960 | 2 | 3790 | 1 | 2310.0 | 1 | 2300.0 |
| | $AlCl_3$ | 4.0 | | | | | | | | | |
| | Urotropin | 8.0 | | | | | | | | | |

The described preferred formulations based on dissolved metal compounds, especially aluminum salts, and activators have the advantage that inorganic gels are formed. In addition, the inorganic gels can also be removed very easily from the formation again if required, by injecting acid into the formation and dissolving the gels.

Further examples of gel-forming aqueous formulations comprise formulations based on polyacrylamides and trivalent or tetravalent cations, for example Cr(III), Fe(III) or Zr(IV) as crosslinkers. In the case of use of this system, acrylamide groups are hydrolyzed at least partly to carboxylate groups, which can crosslink with the cations. On application, polyacrylamides with different degrees of hydrolysis can used, which can achieve different gelation times and penetration depths.

As a further alternative, it is possible to use silicate gels, for example colloidal silicate gels or combined polymer/silicate gels. Sodium silicate forms, with different chemicals, a sol or a gel-like material which can reduce permeability. The gel can be varied within wide ranges in relation to density, viscosity, solids contents and other properties. The advantages of the system are low operating costs and stability at relatively high temperatures. It is also known that silicate solutions can be used in combination with polymers, for example polyacrylamide. This allows improved long-term stability (aging) and better thermal stability to be achieved.

Process Step (IV)

After the closure of the highly permeable regions of the mineral oil formation in the region between the injection and production boreholes, the production of mineral oil is continued by injection of flooding water and withdrawal of mineral oil through the at least one production borehole.

Figure 4:
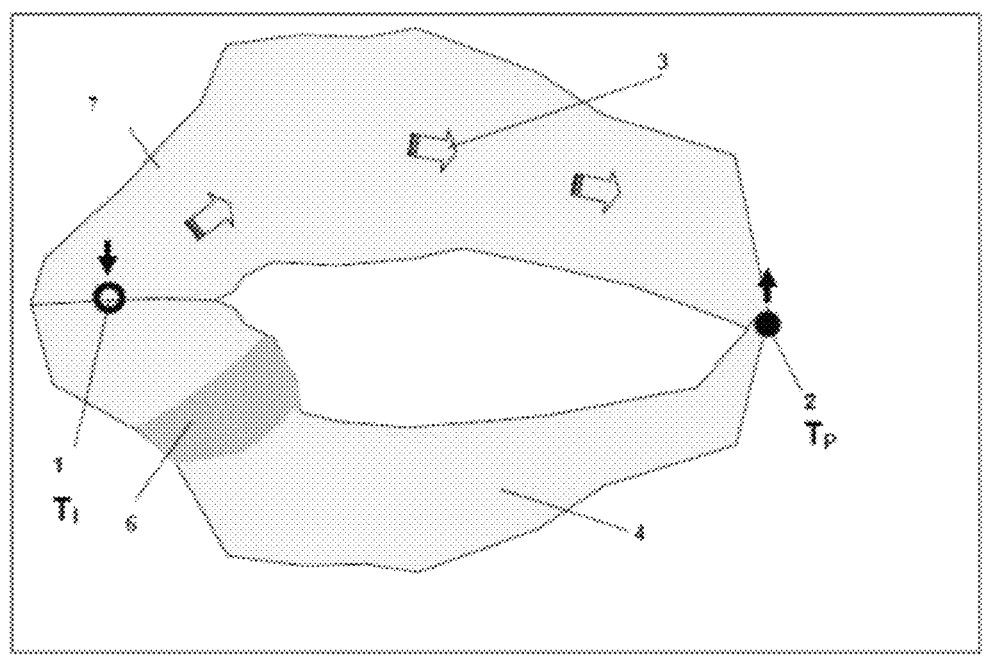
FIG. 4 Schematic diagram of the formation of a new flood zone.
Figure 3:
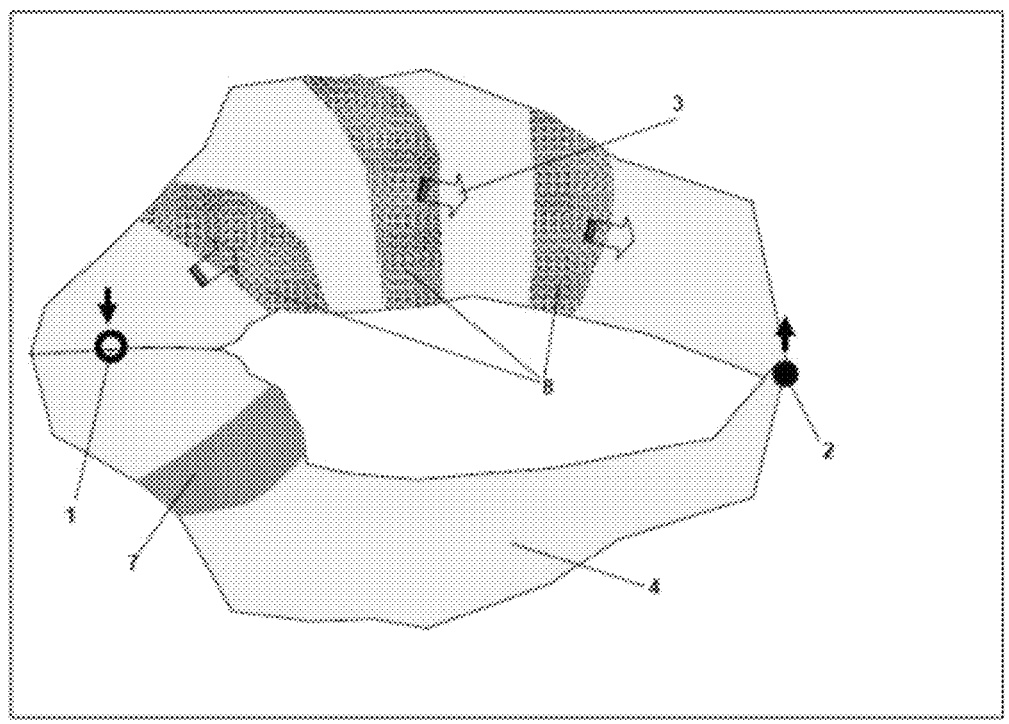

Since the existing flooding paths have been closed with a gel in the course of process step (III) and flow through them is accordingly no longer possible, mineral oil from low-permeability regions of the mineral oil formation which have not been covered by the water flooding to date is also collected, and it is thus possible to produce further mineral oil from the formation. This is shown schematically in FIG. 4. The original flooding path (4) has been closed by means of a gel plug, and a new flooding path (7) is formed, through which mineral oil is forced out of the formation to the production borehole. Details of the displacement of the mineral oil and, where appropriate, the formation of preferred flooding paths have already been specified in the description of process step (I).

Process Step (V)

To further enhance the mineral oil yield, after performance of process step (IV), process step (V) is conducted. Unless stated otherwise, this is a repetition of process step (I).

Process step (V) should be carried out no later than recurrence of watering out of production which is no longer acceptable in process step (IV). However, it can also be carried out at an earlier stage, for example when the formation in the region of the new flooding path has a very low permeability, such that mineral oil production is unsatisfactory. According to the duration of water flooding in process step (IV), the temperature in the region of the new flooding paths may be lowered only slightly or lowered significantly compared to the formation temperature. In addition, the temperature difference between the injection borehole and production borehole $T_P-T_I$ may be very different. In the case of only a short duration of the water flooding, it may be very low, for example only 1 to 5° C., and in the case of long duration it may be very marked as already outlined above, for example 5° C. to 60° C., preferably 10° C. to 55° C. and more preferably 15° C. to 50° C.

For process step (V) too, two variants should be distinguished, namely the injection of microorganisms into the formation (process step (Va)) or the activation of oil-mobilizing microorganisms already present in the formation (process step (Vb)). By means of the injection or the activation of microorganisms, additional mineral oil in the new flood zone can be mobilized. This is shown schematically in FIG. 5.

In preferred embodiments of the invention, the microorganisms injected in process step (Ia) and process step (Va) are particularly matched to one another.

In one embodiment, mesophilic microorganisms are injected in process step (Ia), and thermophilic and/or hyperthermophilic microorganisms in process step (V).

In a further embodiment, psychrophilic microorganisms are injected in process step (Ia), and mesophilic and/or thermophilic and/or hyperthermophilic microorganisms in process step (V).

Both variants are particularly suitable for formations in which the flow zone in process step (I) has already cooled distinctly, and already has a temperature distinctly below the deposit temperature $T_L$. In this case, it is advantageous to mobilize mineral oil using microorganisms which can already grow at comparatively low temperatures. The flow zone which newly forms in process step (IV) is within less permeable regions of the formation and can accordingly cool to a lesser degree. It is therefore advisable here to use microorganisms which have a higher optimal growth temperature than those used in step (I).

Process Step (VI)

After the mobilization of mineral oil in the formation by means of process step (IV), the production of mineral oil is continued by injecting flooding water into the injection borehole and withdrawing mineral oil through the production borehole. The oil mobilized by the microorganisms is thus produced by further water flooding.

Further Process Variants

The process according to the invention may also comprise further variants.

It is possible, for example, to repeat process steps (III), (IV), (V) and (VI) for a second time. In this case, the new flood zone formed in the course of the process is closed by means of a gel, and a further flood zone is formed between the injection borehole and the production borehole.

Figure 6:
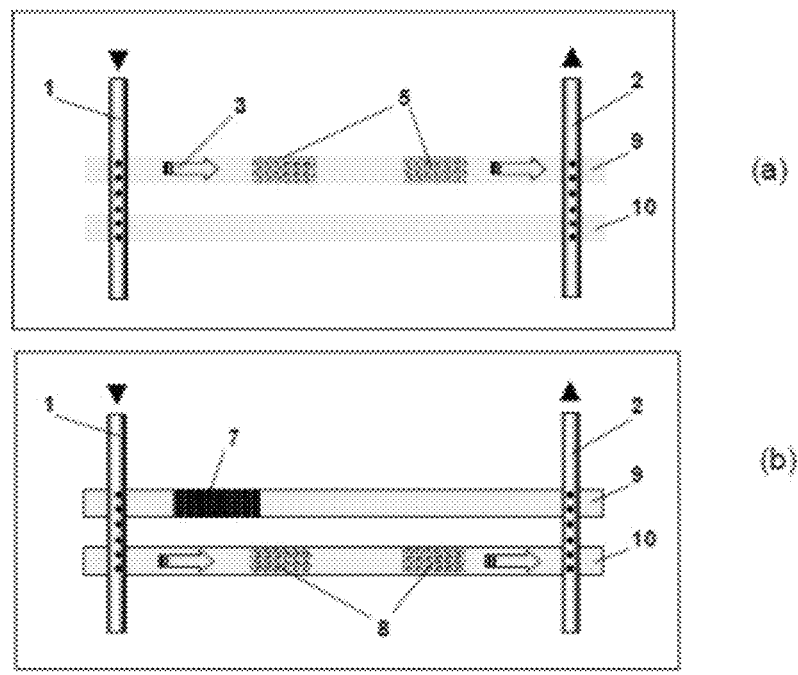
FIG. 6 Schematic diagram of the application of the process to a deposit with several production horizons.

The process according to the invention can also be used when mineral oil is to be produced simultaneously from a group of horizons (strata at different depth) with different permeability. This is shown schematically in FIG. 6. FIG. 6 shows, schematically, an injection borehole (1) and a production borehole (2) which are set up for oil production from two different horizons. In this embodiment, process step (I) is first applied to the already cooled horizon with high permeability (9) (FIG. 6a). Finally, the horizon (9) is closed by applying a gel-forming formulation (process step (III)). The closure is followed by production from the second horizon (10) which has the original deposit temperature, and microorganisms are employed to mobilize mineral oil. In the cooled horizon (9), portions (5) of microorganisms (psychrophilic or mesophilic) are injected. In the horizon (10) with elevated temperature, portions (8) of microorganisms (thermophilic or hyperthermophilic) are injected.

The process according to the invention comprising a combination of the use of microbiological methods (Microbiological Enhanced Oil Recovery (MEOR)) to increase the oil yield and the blockage of highly permeable regions of the mineral oil formation (conformance control) leads to an improvement in oil yield and hence in exploitation of the formation. Compared to other methods/processes for improving the oil yield, the MEOR method is inexpensive. The combination with conformance control is thus also a very economically viable process.

The invention claimed is:

1. A process for producing mineral oil from underground mineral oil deposits with deposit temperatures ($T_L$) in the range from 25° C. to 120° C., into which at least one injection borehole and at least one production borehole have been sunk, and mineral oil is produced from the deposit, by injecting aqueous flooding media into the at least one injection borehole and producing mineral oil through the at least one production borehole, flooding water of temperature <25° C. being injected in a process step (0) such that—as a result of the continued injection of the flooding water—the temperature of the deposit at the site of the injection borehole ($T_I$) is lowered compared to the original deposit temperature $T_L$ and a temperature gradient is built up between the injection borehole and the production borehole with a temperature $T_p \leq T_L$, wherein the process additionally comprises—in the sequence mentioned—at least the following steps in which the aqueous flooding media mentioned below are each injected into the formation through said at least one injection borehole:
   (I) mobilizing mineral oil in the formation by means of microorganisms by
      (Ia) injecting at least one aqueous formulation of oil-mobilizing microorganisms, an aqueous nutrient solution and optionally an oxygen source, and/or
      (Ib) activating oil-mobilizing microorganisms already present in the formation by injecting an aqueous nutrient solution and optionally an oxygen source,
   (II) injecting flooding water,
   (III) blocking highly permeable regions of the formation,
   (IV) injecting flooding water,
   (V) mobilizing mineral oil in the formation by means of microorganisms by repetition of process step (I), and
   (VI) injecting flooding water.

2. The process according to claim 1, wherein watering out of production has already set in as a consequence of the continued injection of flooding water in process step (0).

3. The process according to claim 1, wherein, in a step preceding process step (I), the temperature distribution is analyzed in the region between the injection borehole and the production borehole.

4. The process according to claim 1, wherein process step (I) is process step (Ia).

5. The process according to claim 4, wherein the optimal growth temperature $T_W$ of the microorganisms used in process step (Ia) is in the range from $T_I$ to $T_L$.

6. The process according to claim 4, wherein, in process step (Ia), n portions of different microorganisms with different optimal growth temperatures $T_w$ are injected successively, commencing with the microorganisms with the highest $T_w$, with decreasing $T_w$ of the microorganisms from portion to portion.

7. The process according to claim 4, wherein mesophilic microorganisms are injected in process step (Ia), and thermophilic and/or hyperthermophilic microorganisms in process step (V).

8. The process according to claim 4, wherein psychrophilic microorganisms are injected in process step (Ia), and mesophilic and/or thermophilic and/or hyperthermophilic microorganisms in process step (V).

9. The process according to claim 8, wherein the blocking of highly permeable regions of the formation is undertaken by injecting at least one aqueous, gel-forming formulation (F), said formulations (F) comprising water and one or more water-soluble or water-dispersible components which form high-viscosity gels after injection into the deposit under the influence of the deposit temperature.

10. The process according to claim 9, wherein the aqueous, gel-forming formulation (F) is an acidic aqueous formulation at least comprising:
    water,
    aluminum(III) compounds which are dissolved therein and can form gels when admixed with bases, and
    a water-soluble activator which brings about an increase in the pH of the aqueous solution above a temperature $T_{gel}$, selected from the group of urea, substituted ureas, hexamethylenetetramine and cyanates.

11. The process according to claim 10, wherein the aluminum(III) compound is at least one selected from the group of aluminum(III) chloride, aluminum(III) nitrate, aluminum(III) sulfate, aluminum(III) acetate and aluminum(III) acetylacetonate.

12. The process according to claim 1, wherein the oxygen source in process step (Ia) or (Ib) is an oxygenous gas.

* * * * *